Jan. 3, 1956

R. W. WILSON 2,729,350

RECEPTACLE HANDLING DEVICE

Filed Feb. 2, 1953

INVENTOR.
RAYMOND W. WILSON

BY *W. A. Schaich*

AND *H. P. Settle, Jr*

ATTORNEYS

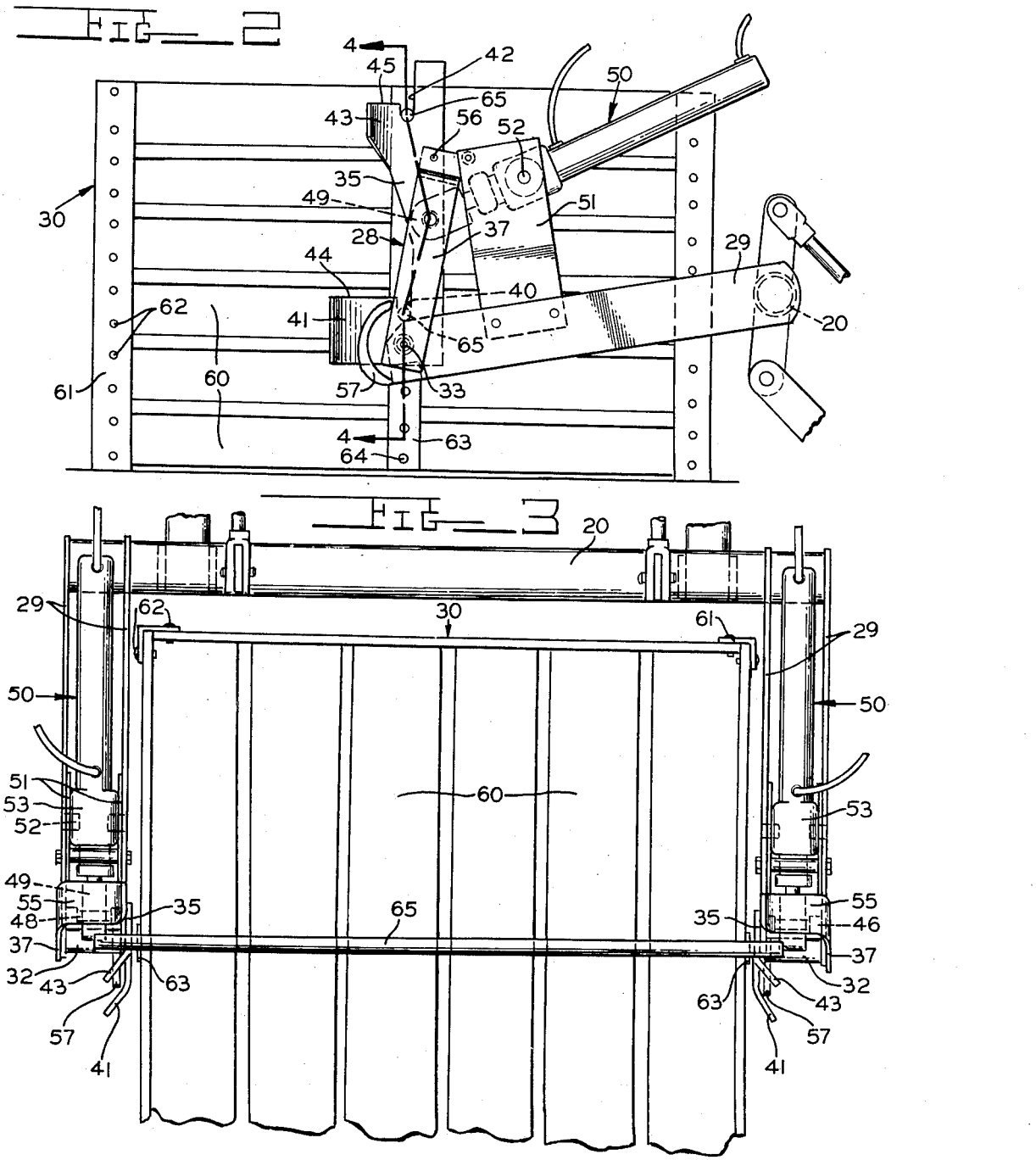

Jan. 3, 1956  R. W. WILSON  2,729,350
RECEPTACLE HANDLING DEVICE
Filed Feb. 2, 1953  3 Sheets-Sheet 3
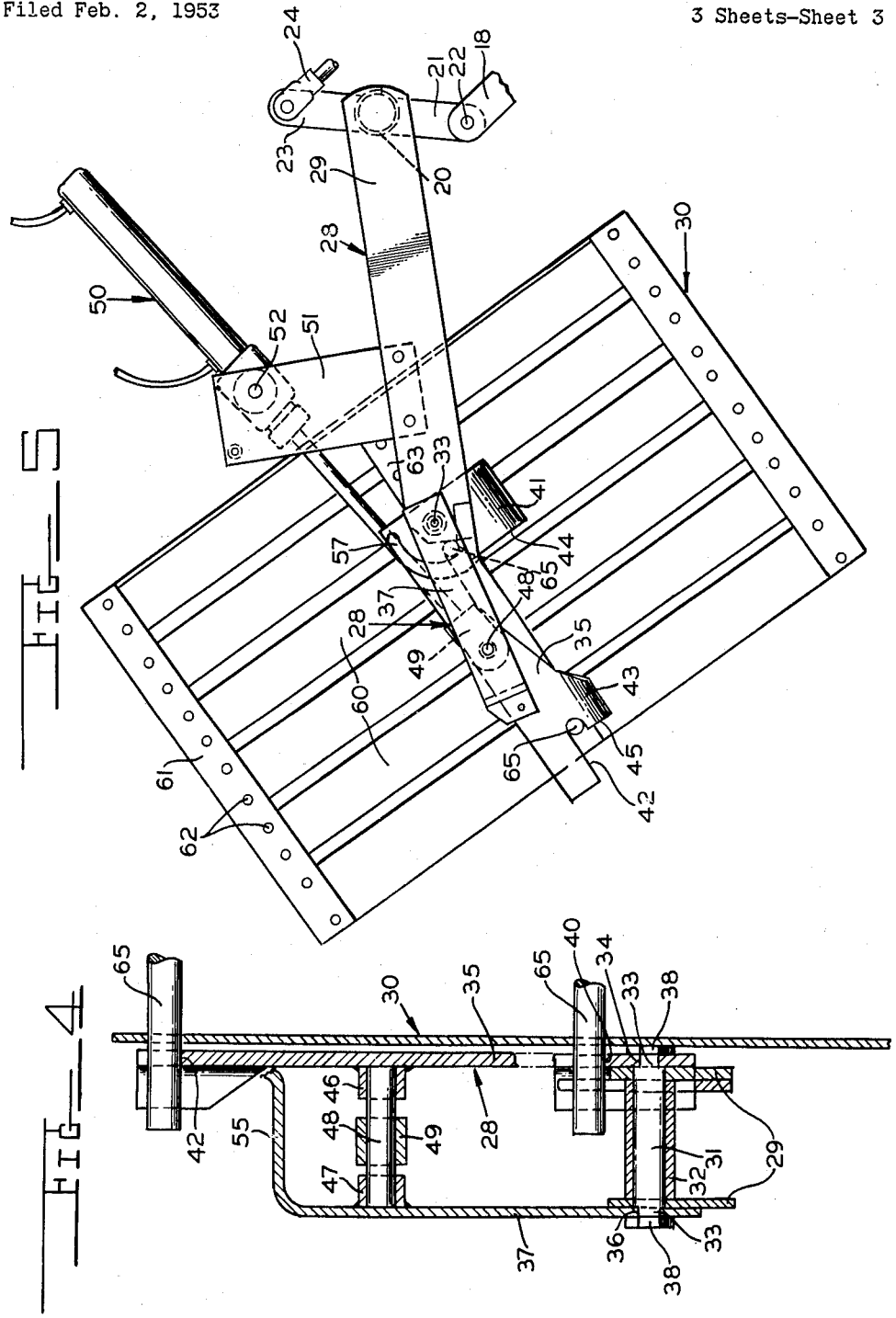
INVENTOR.
RAYMOND W. WILSON
BY
AND
ATTORNEYS

United States Patent Office 2,729,350
Patented Jan. 3, 1956

2,729,350

RECEPTACLE HANDLING DEVICE

Raymond W. Wilson, Ferndale, Mich., assignor, by mesne assignments, to Ford Motor Company, Dearborn, Mich., a corporation of Delaware Application February 2, 1953, Serial No. 334,428

5 Claims. (Cl. 214—313)

The present invention relates to a material handling apparatus for a tractor and more particularly to an apparatus for elevating and dumping particulated and/or flowable material.

The material handling apparatus of the present invention is particularly adapted to the loading and/or dumping of flowable or particulated materials, such as citrus fruits or the like contained within open-topped receptacles or crates. The apparatus preferably takes the form of an attachment for a standard tractor-mounted loader having lifting booms extending forwardly of the tractor and having free forward ends movable in an arcuate vertical path. By the use of the attachment of the present invention, the receptacles or containers within which the material is confined may be elevated and/or lowered in such manner that the receptacle is not tilted during vertical movement, but rather remains substantially parallel to the ground. The receptacle may be tilted for dumping about a transverse axis at any point during its vertical travel, the receptacle being dumped from and returned to its horizontal position under complete power control.

Generally, the attachment includes a pair of forwardly extending main support or lift arms and a relatively movable dumping arm pivotally attached to each support arms, the arms being adapted to project along either lateral extremity of the receptacle to engage vertically spaced, laterally projecting trunnions carried by the receptacle. Remote controlled power means are provided for actuating the dump arms for relative movement, so that the trunnions engaged thereby are moved in an arcuate path relative to the lift arms to at least partially invert the receptacle under the control of the power means. Preferably, the receptacle trunnions are received by open-topped slots on the dump arms and, during dumping movement, one of the trunnions is locked against displacement from the dump arm by virtue of this one trunnion being positioned behind a retaining element carried by the adjacent lift arm. Thus the receptacle cannot be displaced from the dump arms during dumping movement.

It is, therefore, an important object of the present invention to provide an improved material handling apparatus adapted to engage vertically spaced portions of a receptacle and to invert the receptacle.

Another important object is the provision of a material handling apparatus effective to both elevate and dump a receptacle having vertically spaced trunnions engageable by a dumping mechanism forming a portion of the apparatus.

It is a further important object to provide a receptacle handling apparatus whereby a receptacle having vertically spaced trunnions is engaged by a normally vertically extending dumping arm actuatable by power means for arcuate movement to at least partially invert the receptacle, displacement of the trunnions being prevented by engagement of at least one trunnion with a fixed retaining member.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 2 is an enlarged fragmentary side elevational view of the apparatus of Figure 1, particularly illustrating the receptacle and the elevating and dumping means therefor;

Figure 3 is an enlarged fragmentary plan view of that portion of the apparatus shown in Figure 2;

Figure 4 is a greatly enlarged sectional view taken along the plane 4—4 of Figure 2; and Figure 5 is a view similar to Figure 2 illustrating the handling apparatus and the receptacle in a dumped position.

As shown on the drawings:

Figure 1:
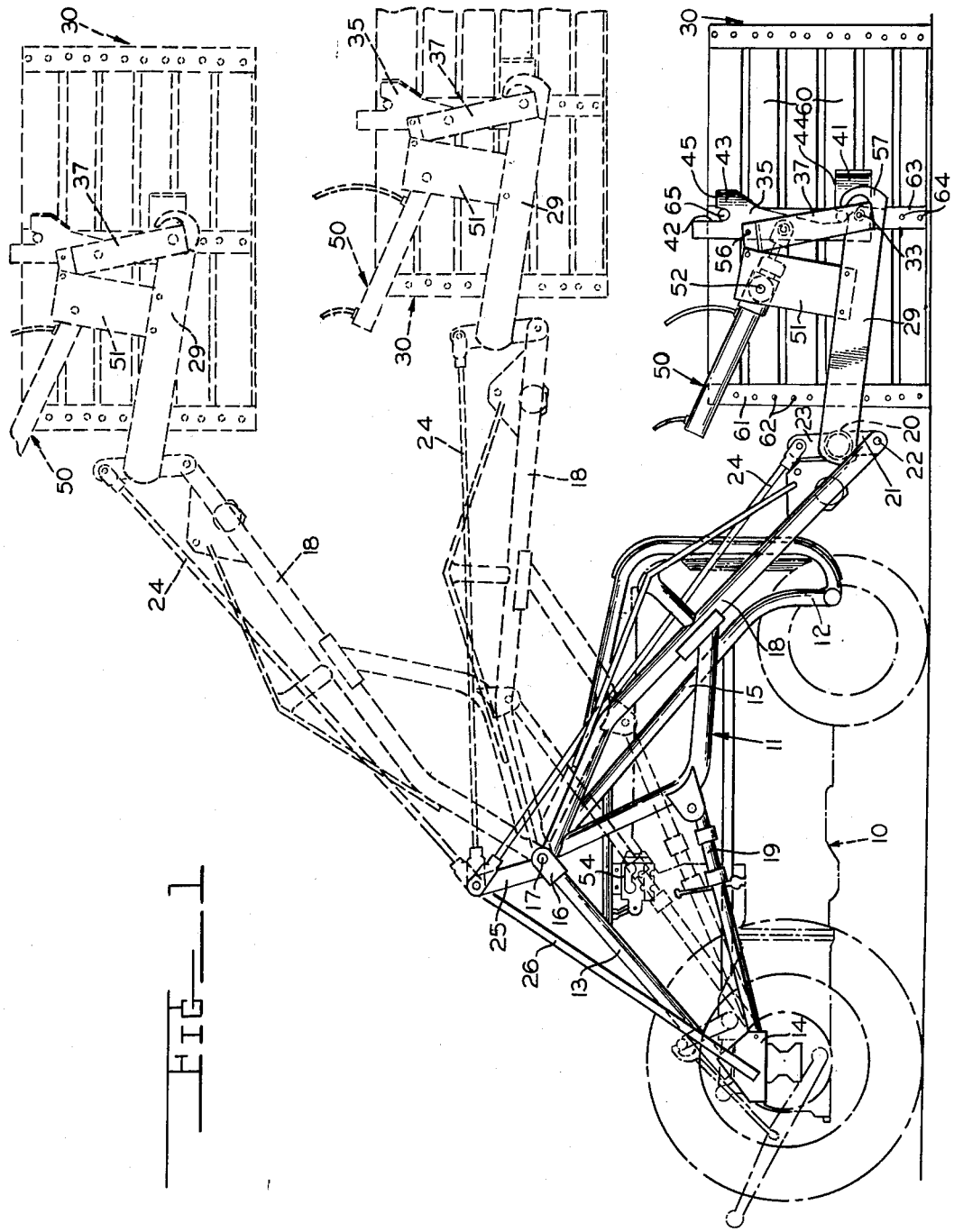
Figure 1 is a side elevational view of a material handling apparatus of the present invention mounted upon a prime mover and illustrating a material receptacle carried thereby in a plurality of elevated positions.

As shown on the drawings in Figure 1, reference numeral 10 refers generally to a tractor 10 or similar prime mover upon which is disposed a material handling apparatus of the present invention indicated generally by reference numeral 11.

More particularly, the device 11 includes a fixed frame 12 mounted upon the tractor 10 and including a pair of laterally spaced upwardly and forwardly inclined posts 13 secured at their lower rear ends to rear axle brackets 14 fixed to the tractor. The fixed frame also includes a forwardly extending bumper structure 15 secured to the tractor front axle mounting (not shown) and cooperating with the posts 13 to distribute the weight of the device 11 and its load upon the tractor front and rear axles. It will be appreciated that the pair of posts 13 are provided to extend longitudinally along each side of the prime mover 11. The posts 13 each terminate at the upper forward end thereof in a clevis 16 mounting a lateral pivot pin 17. The pivot pins 17 carry forwardly extending laterally spaced loader booms 18 projecting forwardly beyond the bumper structure. An actuating hydraulic cylinder 19 is connected between each boom 18 and the associated bracket 14, so that, upon actuation of the cylinders 19, the booms 18 are raised and lowered, as best shown in Figure 1.

The free forward ends of the booms 18 are joined by a laterally extending tubular cross-shaft 20 (Figure 2) having laterally spaced pairs of depending ears 21 longitudinally aligned with the loader booms. Each pair of ears 21 carries a laterally extending pin 22 pivotally securing the terminal end of the associated boom therebetween, so that elevation and lowering of the booms causes corresponding vertical movement of the cross shaft 20. The cross shaft 20 also carries an upstanding ear 23 spaced laterally inwardly from each pair of the depending ears 21. The upstanding ears 23 are pinned or otherwise pivotally connected to a generally rearwardly extending stabilizer rod 24 extending generally parallel to the associated boom 18 for attachment to an upstanding post 25 mounted upon the transverse brace member (not shown) joining the loader posts 13. The posts 25 are each reinforced by a downwardly and rearwardly extending reinforcing rod 26 connected to the rear axle bracket 14 of the tractor 10. The purpose of the stabilizer bars 24 will be readily appreciated from an inspection of the adjusted positions of the booms 18, the cross shaft 20 and the stabilizing rods 24 in Figure 1 of the drawings. The height of each post 25 is substantially the same as the combined heights of the ears 21 and 23, and the stabilizer bars are of substantially the same length as the booms 18, so that upon elevation of the booms the parallelism existing between the stabilizer rods 24 and the booms 18 will retain the cross shaft 20 and the ears 21 and 23 at a constant inclination relative to the ground for a purpose to be hereinafter more fully described.

As best illustrated in Figures 2–5, the cross shaft 20 is provided with a forwardly extending lift arm assembly indicated generally at 28. The assembly 28 includes a pair of laterally spaced lift arm assemblies 29 rigidly secured, as by welding, to the ends of the cross shaft 20. The arms 29, as best seen in Figure 3, actually each include a pair of parallel plate-like members immediately adjacent one another and each projecting forwardly from the cross shaft 20, thereof. The forwardly projecting lift arm assemblies 29 are thus laterally spaced to receive therebetween a receptacle indicated generally at 30 and to be hereinafter more fully described.

Adjacent the extreme forward ends of the lift arms 29, there are provided laterally extending pivot pins 31 secured, respectively, to the immediately adjacent arms of each assembly 29 and extending therebetween Figure 4. Each pin 31 is surrounded by a cylindrical bushing 32 interposed between the arms of each assembly 29 and serving to retain the same in spaced apart relation. The laterally inward end of each pin 31 is reduced, as at 33, to project through pivot apertures 34 formed in an upstanding dump arm 35 immediately adjacent the inner one of each pair of arms 29. The other, laterally outward reduced end 33 of each pin projects through an aperture 36 formed in reinforcing member 37 extending upwardly generally parallel with the dump arm 35. The free ends of the pin 31 are threaded to receive thereon clamping nuts 38 which retain the pivot pins 31, the lift arms 29, the dump arms 35, and the reinforcing arms 37 in assembly. The upstanding dumping arms 35 are provided with an open-topped slot 40 adjacent the lower end thereof immediately above the extreme forward ends of the dumping arms 29 and in generally vertical alignment with the pivot pins 33 when the dumping arms are in their carrying position, as illustrated in Figure 2. The dumping arms, immediately adjacent the slot 40, are provided with forwardly projecting guide plates 41 which are laterally outwardly deflected to overlie the immediately adjacent inner member of the associated lift arm 29. The upper end of each of the dump arms 35 is also provided with an open-topped slot 42, and a forwardly extending, laterally outwardly deflected guiding surface 43 is also provided immediately adjacent each of the slots 42. It will be noted that the free upper surfaces 44 and 45, respectively, of the guide portions 41 and 43 are slightly above and forwardly of the slots 40 and 42, respectively.

Each dumping arm 35 is provided, intermediate its vertical dimension, with a laterally outwardly directed bushing 45 (Figure 4), and the adjacent reinforcing arm 37 is provided with a similar inwardly directed bushing 47 adapted to receive therein a mounting pin 48 which extends through the terminal clevis 49 of a double acting hydraulic cylinder 50. The cylinder 50 is supported upon the lift arm 29 by a pair of upstanding, parallel support plates, 51 secured to the lift arms 29, respectively, to project thereabove. The plates 51 carry a laterally extending pivot pin 52 upon which the trunnion block 53 of each cylinder is supported. The remote controlled hydraulic cylinders 50 are each connected to the loader actuating mechanism to receive hydraulic fluid therefrom and the same pressurized fluid which serves to elevate and lower the loader booms 18 is utilized to actuate the cylinders 50 under the control of a control valve 54 mounted on the loader frame.

The reinforcing plate 37 is joined to the dump arm 35 above the cylinder clevis pin 48. More particularly, as best seen in Figure 4, the upper end of the reinforcing plate is bent inwardly, as at 55, toward the dump arm 35 and a laterally extending bolt 56 or the like (Figure 2) is utilized to interconnect these elements.

The forward end of the inner lift arm 29 of each pair of arms carries an upwardly extending locking projection 57 which is arcuate in contour and which has a center of curvature located at the pivot pin 33 about which the dumping arms and the reinforcing arms are pivotally movable relative to the lift arms 29. The free upper end of the projection 57 terminates well ahead of the adjacent slot 40.

The receptacle 30 preferably takes the form of a crate having wooden or metal slats 60 extending along the sides, ends, and bottoms thereof, the slats being joined by angle irons, 61 rigidly secured thereto, as by bolts 62. Each lateral side of the crate also carries a vertically extending strap 63 secured to the slats 60, as by bolts 64, and the straps 63 serve to support therebetween a pair of vertically spaced laterally extending trunnion rods 65 which project laterally beyond the crate sides in vertically spaced relation. Actually, the vertical spacing of the trunnion rods 65 corresponds to the spacing of the bottoms of the slots 40 and 42 formed in the vertically extending dump arms 35.

The operation of the device of the present invention will be readily appreciated from an inspection of Figures 1, 2, and 5 of the drawings. The crate 30 is picked up from the ground by lowering the boom 18 beyond its position illustrated in solid lines in Figure 1 and then advancing the apparatus of the present invention toward the crate by driving the tractor 10 forwardly so that the lift arms 29 pass on either side of the crate and until such time as the laterally extending portions of the trunnions 65 are vertically aligned with the slots 40 and 42. If the receptacle should be tilted on the ground, the dump arms 35 may be correspondingly tilted by actuation of the cylinders 50. The longitudinal positioning of the arms along the crate sides is accommodated by the vertically extending arm surfaces forming a continuation of the rear surface of the slots, 40 and 42, respectively.

After the arms have been thus positioned adjacent each side of the crate 30, the loader is actuated through the loader cylinders 19 to elevate the boom 18 and the crate is elevated after the trunnion 65 recedes in the slots 40 and 42. Vertical movement of the crate is controlled by the parallelism existing between the ears 21 and 23, the booms 18, the stabilizer rods 24, and the post 25, and the crate remains at a horizontal position during each lifting movement to facilitate the stacking of a plurality of crates and the loading of the crates upon a truck or the like.

When it is desired to dump the contents of the crate, it is only necessary to actuate the valve 54 so as to utilize the remote cylinders 50. Extension of the rods of the cylinders 50 will effect pivoting movement of the dumping arms 35 and the reinforcing arms 33. Of course, the trunnions 65 will also be pivoted above the pin 33, inasmuch as the trunnions are carried solely by the dumping arms. Such forward movement of the dumping arms will actuate the crate toward its dumping position, illustrated in Figure 5, and the lower trunnion 65 will move beneath the projection 57 at the forward end of each of the inner lift arms 29. Thus, the lower trunnions 65 cannot escape from the dumping arm slots 40 and since the vertical distance between the trunnions is fixed, the upper trunnions 65 cannot escape from the slots 42.

Thus, the crate will be inverted upon actuation of the cylinders 50 and initial dumping movement of the crate will move the lower trunnion beneath the projection 57 to prevent displacement of the crate from the apparatus 28.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a material handling apparatus, a material receptable having vertically spaced trunnions projecting laterally beyond opposing sides thereof, lift arms capable of being extended along opposing sides of said receptacle and respectively insertable beneath said trunnions, a normally vertically extending dump arm on each of said lift arms and simultaneously engageable with said trunnions upon elevation of said lift arms, boom means for elevating and lowering said lift arms, power-operated means carried by said lift arms and connected to said dump arms, said dump arms being arcuately movable relative to said lift arms to tilt said receptacle through the trunnions engaged by said dump arms, movement of said dump arms taking place about a pivot axis located on said lift arms, and fixed projections on said lift arms in longitudinal alignment with one of said trunnions and against which said one trunnion abuts during tilting movement to prevent displacement of said receptacle during tilting movement thereof.

2. In a material handling device, a prime mover, a pair of laterally spaced booms pivoted to said prime mover for vertical movement of the boom free ends, power means for actuating said booms for movement, a pair of laterally spaced lift arms forming longitudinal extensions of said booms and vertically movable therewith, linkage means connecting said lift arms and said prime mover to retain said lift arms in a horizontal plane during all stages of vertical movement thereof, a receptacle having a pair of laterally extending trunnions beneath which said lift arms are insertable, dumping arms pivotally carried by said lift arms, respectively, and having slots therein for receiving said trunnions, additional power means energizable independently of said boom power means for moving said dumping arms to tilt said receptacle, through the trunnions engaged by said dumping arms, about the pivotal connection of said dumping arms to said lift arms, and an arcuate hook-like projection on said lift arms aligned with the trunnions engaged by said dumping arms, said projection having a trunnion-engaging surface concentric with said pivotal connection of said dumping arms to engage said trunnion during dumping movement of the receptacle to prevent displacement thereof.

3. In a receptacle dumping device, a receptacle having vertically aligned, transversely extending trunnions, laterally spaced lift arms capable of being extended longitudinally of said receptacle to underlie said trunnions, power means for elevating said lift arms, dumping arms having vertically aligned and spaced slots receiving said trunnions upon elevation of said lift arms, said dumping arms being pivotally attached to said lift arms, respectively, for movement relative thereto, an arcuate arm rigid with said lift arms defining an arcuate slot into which one of said trunnions is moved upon initial pivoted relative movement of said arms to lock said trunnion in place, and power means for effecting pivoted relative arm movement to tilt said receptacle by virtue of dumping arm engagement with said trunnions, movement of said receptacle taking place about the pivot axis defined by the pivotal attachment of said dumping and lift arms, and falling of said receptacle from said trunnion slots being prevented by said arcuate arms.

4. In a material handling apparatus having a vertically swingable boom, a pair of laterally spaced forwardly projecting lift arms on said boom for movement therewith, a material receptacle having a pair of vertically spaced trunnions projecting laterally beyond each side thereof, a dumping arm pivoted to each of said lift arms, respectively, about a pivot axis, an arcuate arm rigid with said lift arms each defining a slot concentric with said pivot axis and adapted to receive one of said trunnions therein upon dumping of said receptacle, each of said dumping arms having open-topped notches receiving said trunnions therein upon elevation of said lift arms, and means for effecting dumping arm movement so that said receptacle trunnions are tilted thereby about said pivot axis to dump the contents of said receptacle, with the entry of said trunnions into said lift arm slots preventing displacement of said receptacle from said arms.

5. In a material handling device, a material receptacle having a pair of vertically spaced trunnions projecting laterally beyond each side thereof, a vertically swingable boom, laterally spaced lift arms carried by said boom for movement therewith to project therebeyond for extension alongside each side of said receptacle, dumping means pivotally secured to each of said lift arms, respectively, for movement therewith and for arcuate movement relative thereto about a lateral pivot axis each having slots therein for receiving said trunnions on either side of said receptacle, said dumping means solely supporting said receptacle and being removable therefrom upon lowering the same relative to said receptacle to remove said trunnions from said slots, said lift arms having rigid extensions at the free forward ends thereof defining arcuate open-topped slots centered at said pivot axis, and power means for effecting relative lift arm-dumping means movement about the points of pivotal attachment to move both of the trunnions received by said dumping arms forwardly about said pivot axis to at least partially invert said receptacle, the lower one of said trunnions being moved into said lift arm slot during such dumping to prevent displacement of said trunnions from said dumping arm slots.

References Cited in the file of this patent

UNITED STATES PATENTS

| | | |
|---|---|---|
| 1,753,756 | Small | Apr. 8, 1930 |
| 2,619,244 | Smith | Nov. 25, 1952 |
| 2,626,070 | Ezell et al. | Jan. 20, 1953 |